United States Patent [19]
Kwon et al.

[11] Patent Number: 5,745,180
[45] Date of Patent: Apr. 28, 1998

[54] LOW-DELAY ENCODING METHODS OF MOVING PICTURES

[75] Inventors: Joohan Kwon, Suwon; Jae-moon Jo, Sungnam, both of Rep. of Korea

[73] Assignee: Samsung Electronics Co., Ltd., Kyungki-Do, Rep. of Korea

[21] Appl. No.: 496,785

[22] Filed: Jun. 29, 1995

[30] Foreign Application Priority Data

Jun. 29, 1994 [KR] Rep. of Korea ............... 94-15192

[51] Int. Cl.$^6$ ............... H04N 7/30; H04N 7/32
[52] U.S. Cl. ............... 348/409; 348/415; 348/400
[58] Field of Search ............... 348/409, 415, 348/400, 401, 402, 408, 416; H04N 7/30, 7/32

[56] References Cited

U.S. PATENT DOCUMENTS

| | | | |
|---|---|---|---|
| 5,021,879 | 6/1991 | Vogel | 348/400 |
| 5,057,916 | 10/1991 | Krause et al. | 348/416 |
| 5,260,783 | 11/1993 | Dixit | 348/423 |
| 5,365,271 | 11/1994 | Asano | 348/402 |
| 5,377,051 | 12/1994 | Lane et al. | 360/33.1 |
| 5,386,234 | 1/1995 | Veltman et al. | 348/409 |
| 5,412,431 | 5/1995 | Vogel | 348/405 |
| 5,440,345 | 8/1995 | Shimoda | 348/402 |
| 5,491,509 | 2/1996 | Jeong et al. | 348/402 |
| 5,528,284 | 6/1996 | Iwami et al. | 358/405 |
| 5,537,215 | 7/1996 | Niimura et al. | 358/335 |

FOREIGN PATENT DOCUMENTS

| | | | |
|---|---|---|---|
| 0499088 | 8/1992 | European Pat. Off. | H04N 9/00 |
| 0542195 | 5/1993 | European Pat. Off. | H04N 7/32 |

*Primary Examiner*—Tommy P. Chin
*Assistant Examiner*—Vu Le
*Attorney, Agent, or Firm*—Sughrue, Mion, Zinn, Macpeak & Seas, PLLC

[57] ABSTRACT

A method and apparatus for low-delay-encoding digital video data for moving pictures. For removing artifacts appearing on a screen, where there is a large amount of motion in a vertical direction, a modified intra-slice method is used. Similarly, for removing artifacts appearing on a screen, where there is a large amount of motion in a horizontal direction, a modified intra-column method is used. For both the modified intra-slice method and the modified intra-column method, first and second rows of hatched rectangles, called intra-segments, are used to determine where in a given frame intra-frame-encoding is to be performed. Regions outside of these intra-segments are inter-frame encoded. However, while the intra-segments are disposed in a horizontal direction for the intra-slice method, they are disposed in a vertical direction for the intra-column method. Both of these methods can be performed simultaneously, as well.

14 Claims, 5 Drawing Sheets i-TH FRAME (i+1)TH FRAME i-TH FRAME (i+1)TH FRAME

A STRUCTURE OF INTRA-SEGMENT

A STRUCTURE OF INTRA-SEGMENT

LOW-DELAY ENCODING METHODS OF MOVING PICTURES

BACKGROUND OF THE INVENTION

1. Field of the Invention

The present invention relates to a moving pictures encoding technology, and particularly to a low-delay encoding method capable of reducing a time delay generated in encoding and decoding operations into a boundary needed in an actual application.

2. Description of Related Art

Recently, systems such as a high-definition television (HD-TV), a high definition video cassette recorder (HD-VCR), a digital camcorder, a multimedia videophone, a video conference unit, chiefly use a method for digitally encoding and decoding moving pictures and associated audio. The MPEG (Moving Pictures Experts Group) for international standardization of the encoded representation of moving pictures and associated audio, classifies patterns of the pictures into an intra-coded (I) picture, a predictive-coded (P) picture and a bidirectionally predictive-coded (B) picture according to three different encoding methods, and proposes a COP (Group of Pictures) layer for encoding video data having a picture sequence of "IBBPBBPBBI . . . ." The schemes for encoding and decoding the video data using the GOP structure proposed by the MPEG is described in "ISO/IEC 13818-2." A special playback function such as random access function can be accomplished with respect to the video data encoded using the GOP structure in the decoding end. However, since the decoding end cannot perform a normal decoding operation with respect to the GOP until all the video data of one GOP has been received, of a decoding delay phenomenon occurs. Such a decoding delay phenomonen occurs when the decoding end starts to decode a video bitstream which is newly applied due to a channel change, power-on or reset operation.

To reduce a decoding delay time due to the above-described GOP structure, a low-delay encoding technology for encoding video data having a picture sequence of "IPPP . . . " is being researched and developed. Since the structure of "IPPP . . . " does not adopt a concept of the GOP, the random access function is not possible. However, there are merits that a decoding delay time is shorter than that of the GOP structure and complexity of hardware is reduced, because of absence of the B-picture. The low-delay encoding method in intra-codes only a portion of the data in each frame, unlike the GOP structure which adopts a forced intra-frame encoding method with respect to a total of one picture. There are an intra-slice method and an intra-column method as encoding methods used in a low-delay encoding technology. The intra-slice method intra-codes a predetermined number of slices or one slice per picture from the uppermost end to the lowermost end with respect to all P-pictures. FIGS. 1A and 1B show movement of the slice intra-coded by the intra-slice method. On the other hand, the intra-column method intra-codes a column composed of a unit of a predetermined number of bits per picture from the leftmost end to the rightmost end with respect to all P-pictures. FIGS. 2A and 2B show movement of the column intra-coded by the intra-column method.

However, it is know that the intra-slice method is not proper in case of a large amount of vertical movement, and intra-column method is not proper in case of a large amount of horizontal movement. Thus, using only one method cannot completely reconstruct the picture. Problems will be described below, which occur when the video data encoded by the intra-column is applied to a receiver. If a channel change or power-on operation is performed, a decoder in the receiver stores video data in the intra-coded image region and video data in an intra-coded image region as a reference frame picture, and performs motion compensation to restore the picture of the current frame. In this case, however, the reference frame data used for the motion compensation to restore the current frame picture includes the predictive-coded P-picture data. Accordingly, in case of a large amount of the horizontal movement, artifacts are not completely removed from the restored picture even after the intra-coded columns corresponding to one entire screen have been inputted. Such a problem occurs in the same manner when the data encoded by he intra-slice method is restored and in case of a large amount of motion in the vertical direction, as well.

SUMMARY OF THE INVENTION

Therefore, to solve the above problems, it is an object of the present invention to provide a method of removing artifacts effectively even in case of a large amount of motion in the vertical direction, by improving a low-delay encoding method which uses a existing intra-slice.

Another object of the present invention is to provide a method for effectively removing artifacts even in case of a large amount of motion in the horizontal direction, by improving a low-delay encoding method which uses an existing intra-column.

Still another object of the present invention is to provide a method of effectively removing artifacts by combining the improved intra-slice encoding method and the improved intra-column encoding method.

To accomplish the above object of the present invention, there is provided a method of low-delay-encoding digital video data for moving pictures, the method comprising the steps of:

a) determining a first row position of first in intra-segments in an image frame and a second row position of second intra-segments therein, with respect to odd-numbered first intra-segments and even-numbered second intra-segments having a respectively predetermined size which are interposed between each other when the first and second intra-segments are disposed in the row direction on a screen and are placed in the same row axis;

b) intra-frame-encoding video data contained in the first and second intra-segments among the video data in the image frame, and intra-frame-encoding video data which exits outside of the first and second intra-segments; and c) re-determining row positions of the first and second intra-segments with respect to the image frame to be used for encoding, by shifting the first row position of the first intra-segments from the upper end of the scree the lower end thereof by a predetermined interval, and the second row position of the second intra-segments from the lower end of the screen to the upper end thereof by the predetermined interval, whenever the image frame is changed.

To accomplish the other object of the present invention, there is provided a method low-delay-encoding digital video data for motion images, the method comprising the steps of:

a) determining a first column position of first intra-segments in an image frame and a second column position of second intra-segments therein, with respect to odd-numbered first intra-segments and even-numbered second intra-segments having a respectively predetermined size which are interposed between each other when the first and second intra-segments are disposed in the column direction on a screen and are placed in the same column axis;

b) intra-frame-encoding video data contained in the first and second intra-segments among the video data in the image frame, and inter-frame-encoding video data which exists outside of the first and second intra-segments; and c) re-determining column position of the first and second intra-segments with respect to the image frame to be used for encoding, by shifting the first column position the first intra-segments from the end of the screen to the right end thereof by a predetermined interval, and the second column position of the second intra-segments from the right end of the screen to the left end thereof by the predetermined interval, whenever the image frame is changed.

To accomplish the above still another object of the present invention, there is provided a method of low-delay-encoding digital video data for motion images, the method comprising the steps of:

a) determining a first row position of first intra-segments in an image frame and a second row position of second intra-segments therein, with respect to odd-numbered first intra-segments and even-numbered second intra-segments having a respectively predetermined size which are interposed between each other when the first and second intra-segments are disposed in the row direction on a screen and are placed in the same row axis;

b) determining a first column position of third intra-segments in the image frame and at second column position of fourth intra-segments therein, with respect to odd-numbered third intra-segments and even-numbered fourth intra-segments having a respectively predetermined size which are interposed between each other when the third and fourth intra-segments are disposed in the column direction of the screen and are placed in the same column axis;

c) intra-frame-encoding video data contained in the first through fourth intra-segments among fine video data in the image frame, and inter-frame-encoding video data which exists outside of time first through fourth intra-segments; and d) re-determining first and second row positions and first and second column positions of the first through fourth intra-segments with respect to the image frame to be used for encoding, by shifting the first row position of the first intra-segments from the upper end of the screen to the lower end thereof by a predetermined interval, the second row position of the second intra-segments from the lower end of the screen to the upper end thereof by the predetermined interval, the first column position of the third intra-segments from the left end of the screen to the right end thereof by the predetermined interval, and the second column position of the fourth intra-segments from the right end of the screen to the left end thereof by the predetermined interval, whenever the image frame is changed.

BRIEF DESCRIPTION OF THE DRAWINGS

The preferred embodiments are described with reference to the drawings wherein.

DETAILED DESCRIPTION OF THE PREFERRED EMBODIMENT

Preferred embodiments of the present intention will be described below in more detail with reference to the accompanying FIGS. 3 through 6B.

Figure 1A:
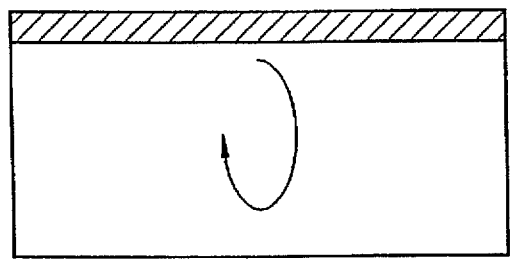
FIGS. 1A and 1B are views for explaining a conventional low-delay encoding method which uses an intra-slice concept.
Figure 1B:
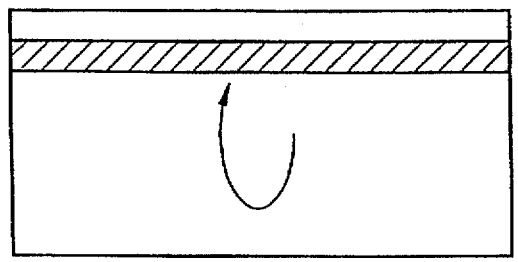
Figure 2A:
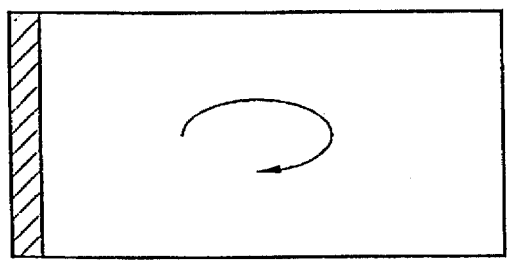
FIGS. 2A and 2B are views for explaining a conventional low-delay encoding method which uses an intra-column concept.
Figure 2B:
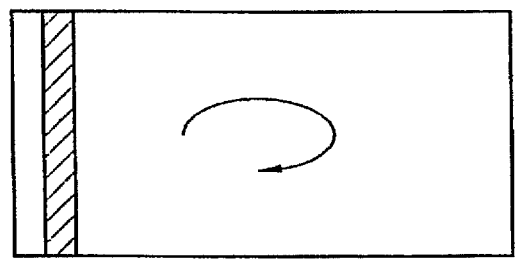
Figure 3:
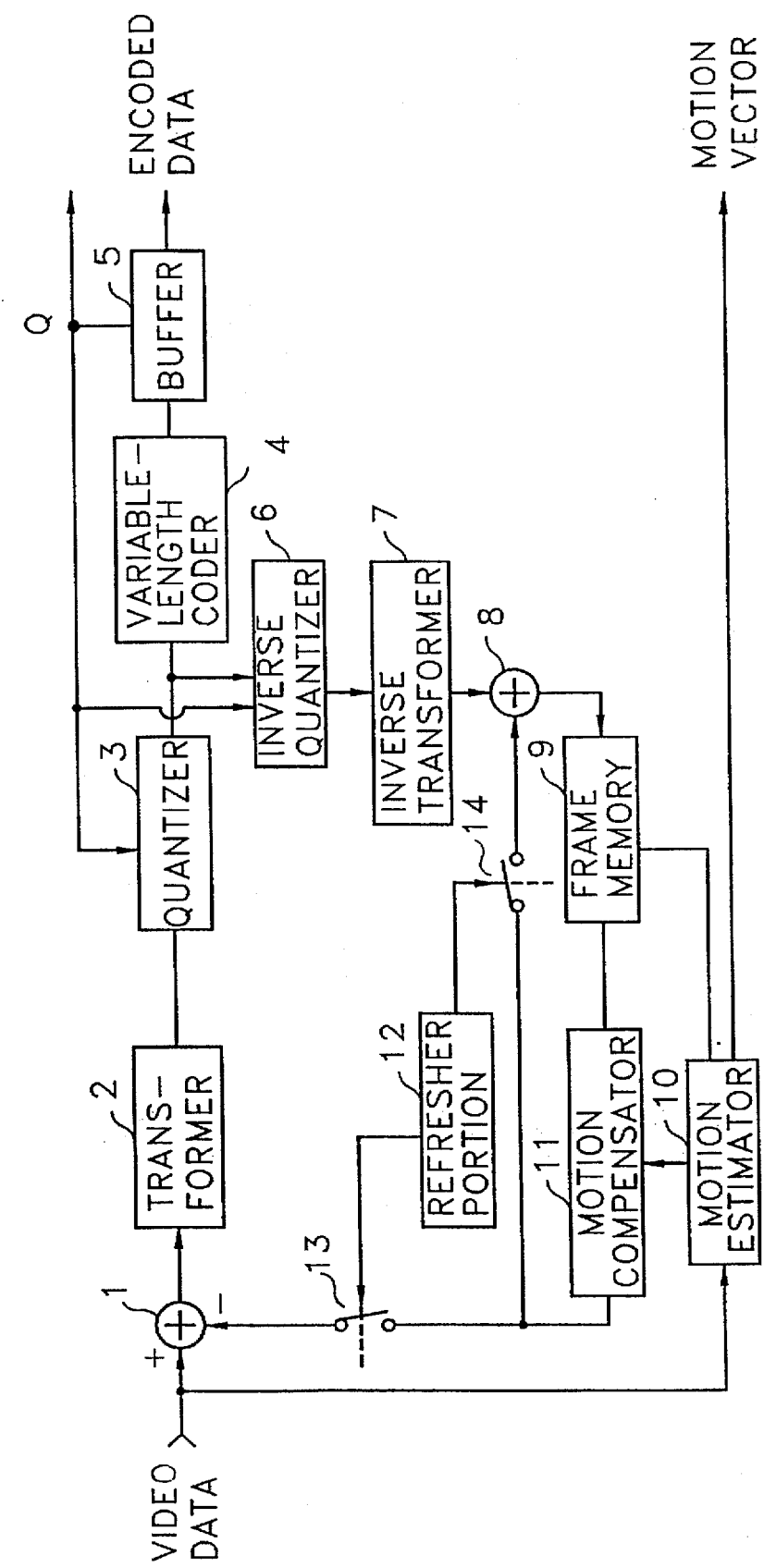
FIG. 3 is a block diagram showing a moving pictures encoding apparatus for improved low-delay encoding methods according to the present invention.

FIG. 3 is a block diagram showing a moving pictures encoding apparatus which operates according to one of the improved low-delay encoding methods of the present invention. The FIG. 3 apparatus encodes video data whose order is determined in units of a block having a predetermined size, which has the same structure as the motion image encoding apparatus proposed by the MPEG, except for a refresher portion 12. In other words, low-delay encoding methods according to the present invention are embodied on the basis of an on- or off-operation of switches 13 and 14 by refresher portion 12.

A low-delay encoding method using a modified intra-slice concept among the encoding methods according to the present invention will be described below with reference to FIGS. 4A and 4B.

Figure 4A:
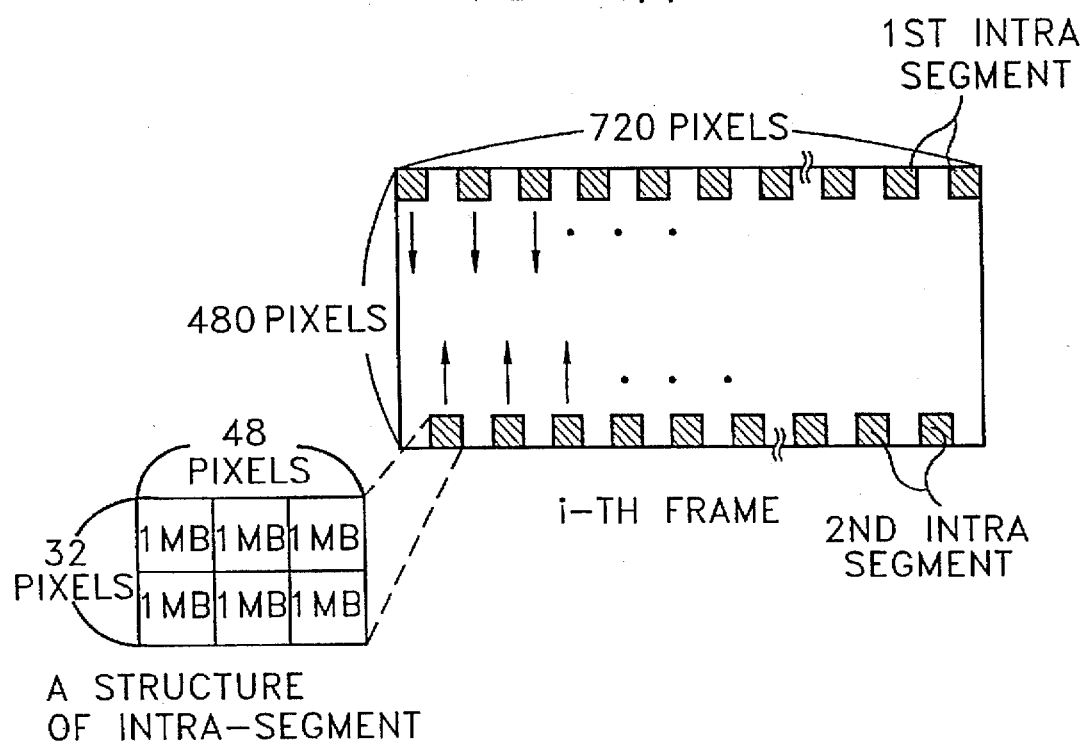
FIGS. 4A and 4B are views for explaining a low-delay encoding method which uses a modified intra-slice concept according to the present invention.
Figure 4B:
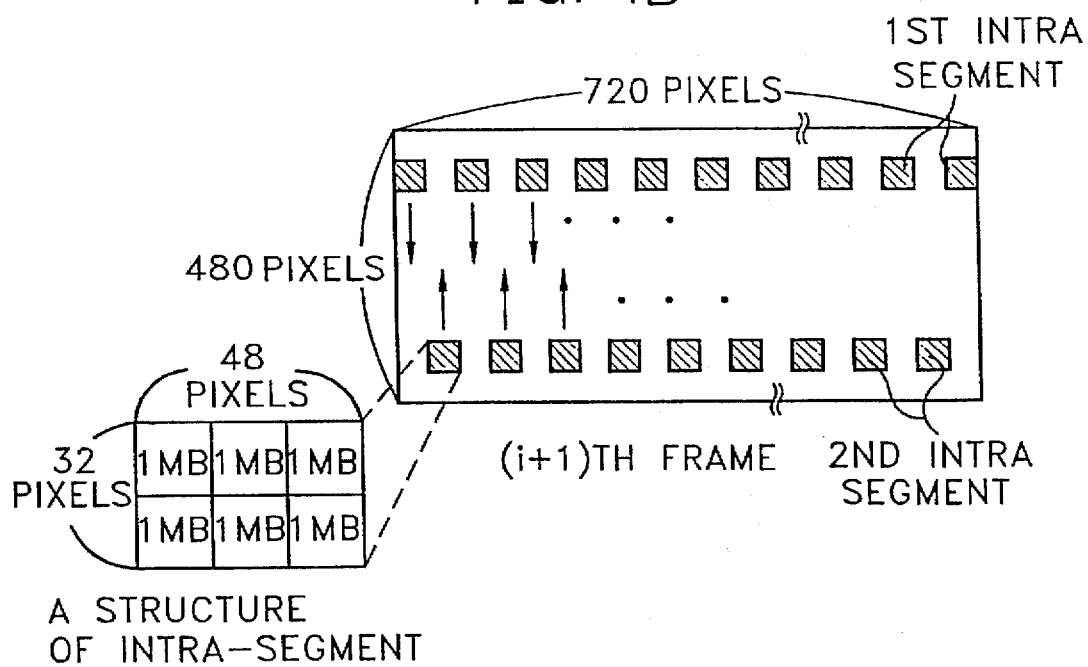

In FIGS. 4A and 4B, intra-segments represented in the form of hatched rectangles includes odd-numbered first intra-segments and even-numbered second intra-segments respectively placed along the horizontal axis. Whenever an image frame is changed, the first intra-segments are shifted to the lower direction of the image frame by a predetermined interval, and the second intra-segments are shifted to the upper direction of the image frame by a predetermined interval. Here, the shift intervals of the first and second intra-segments are the same as the number of pixels the vertical direction of the intra-segments. The shifting of the first and second intra-segments is shown in FIG. 4A, showing an ith image frame, and in FIG. 4B, showing an (i+1)th image frame. When the first and second intra-segments are placed in the same horizontal axis by the shift of position, the first and second intra-segments are interposed therebetween and become the same pattern as that of the existing intra-slices. When the first intra-segments are placed in the uppermost end of the image frame, the second intra-segments are placed in the lowermost end of the image frame. When refresher portion 12 uses the first and second intra-segments to encode the video data of the image frame, artifacts appearing in a screen can be effectively removed even in case of a large amount of motion in the vertical direction.

Another low-delay encoding method using a modified intra-column concept among the encoding methods according to the present invention will be described below with reference to FIGS. 5A and 5B.

Figure 5A:
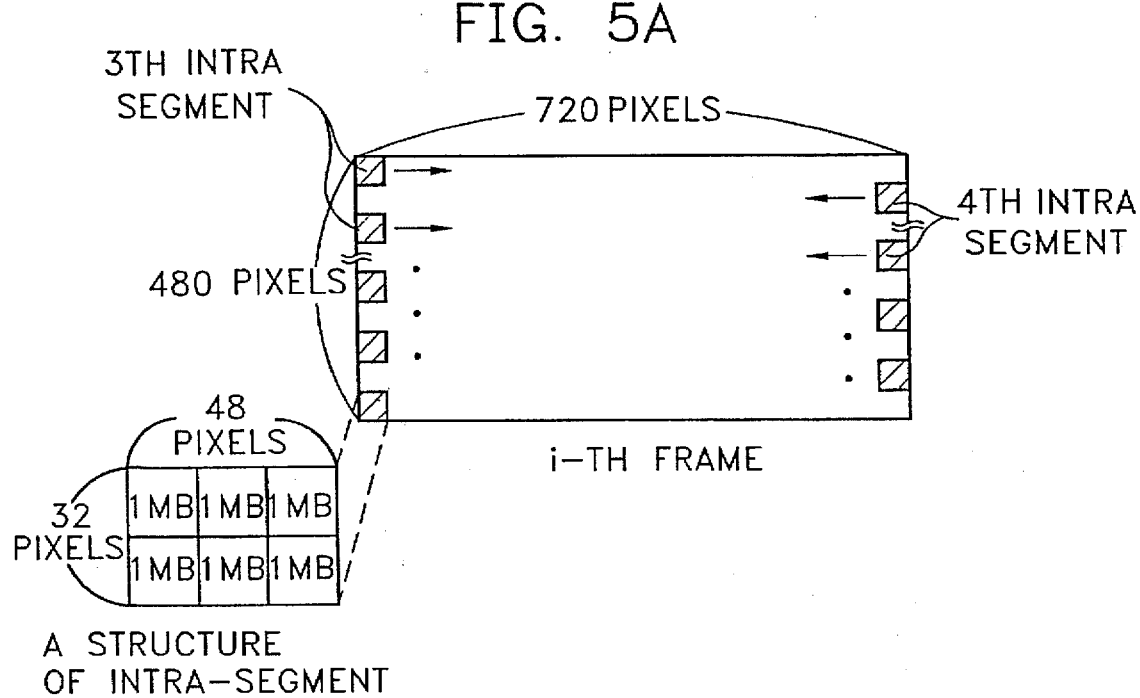
FIGS. 5A and 5B are views for explaining a low-delay encoding method which uses a modified intra-slice concept according to the present invention.
Figure 5B:
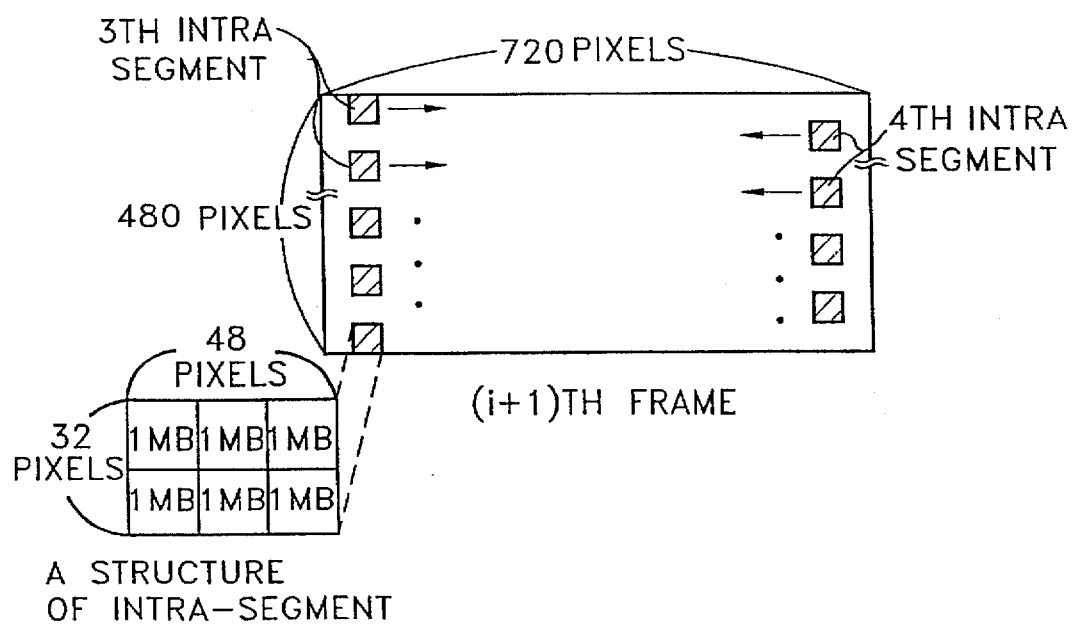

In FIGS. 5A and 5B, intra-segments represented in the form of hatched rectangles include odd-numbered third intra-segments and even-numbered fourth intra-segments respectively placed along the vertical axis. Whenever an image frame is changed, the third intra-segments are shifted to the right of the image frame by a predetermined interval, and the fourth intra-segments are shifted to the left of the image frame by a predetermined interval. Here, the shift intervals of the third and fourth intra-segments are the same as the number in pixels of the horizontal direction of the intra-segments. The shifting of the third and fourth intra-segments is shown in FIG. 5A, showing an ith image frame, and in FIG. 5B, showing an (i+1)th image frame, When the third and fourth intra-segments are placed in the same vertical axis by the shift of the position, the third and fourth intra-segments are interposed therebetween and become the same pattern as that of the existing intra-column. When the third intra-segments are placed in the leftmost end of the image frame, the fourth intra-segments are placed in the rightmost end of the image frame. When refresher portion 12 uses the third and fourth intra-segments to encode the video data of the image frame, artifacts appearing on the screen can be effectively removed even in case of a large amount of motion in the horizontal direction.

Figure 6A:
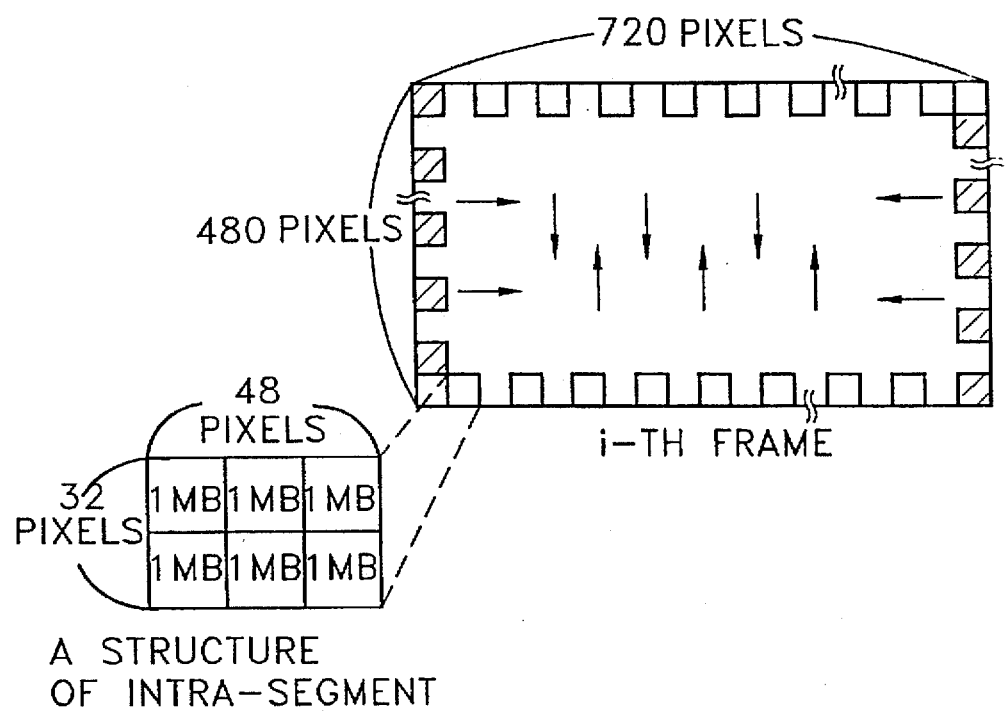
FIGS. 6A and 6B are views for explaining a low-delay encoding method which uses a modified intra-slice concept and a modified intra-column concept according to the present invention.
Figure 6B:
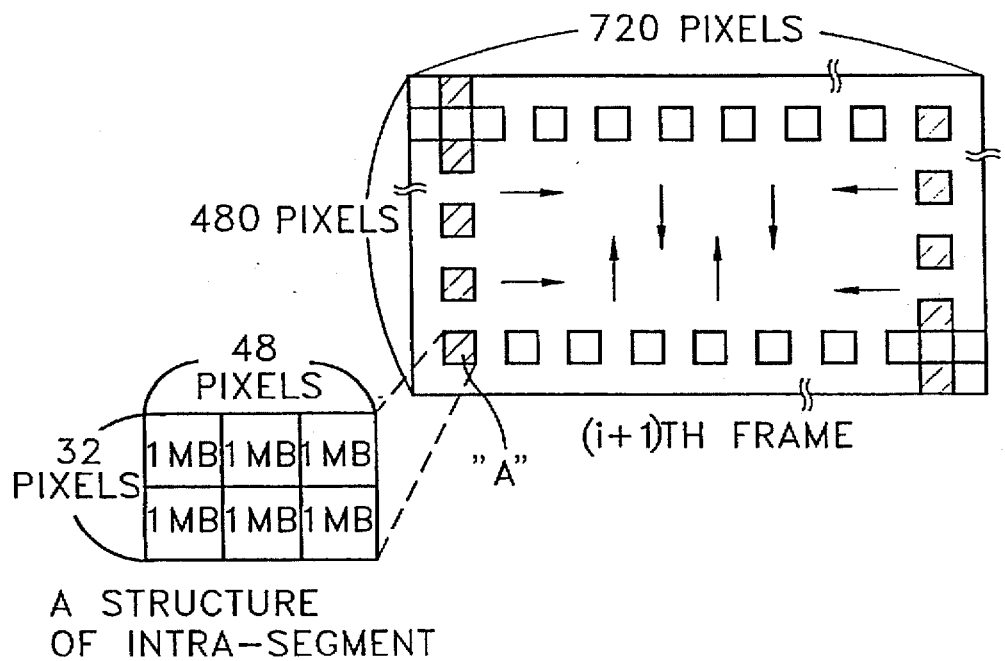

In FIGS. 6A and 6B showing still another low-delay encoding method according to the present invention, first through fourth intra-segments are all used. Thus, the first and second intra-segments shown in FIGS. 6A and 6B are shifted according to the method described referring to FIGS. 4A and 4B and the third and fourth intra-segments shown in FIGS. 6A and 6B are shifted according to the method described referring to FIGS. 5A and 5B. The low-delay encoding method described in connection with FIGS. 6A and 6B can effectively remove artifacts appearing on the screen even in case of a large amount of motion with respect to both the horizontal and vertical directions.

When the number of the pixels with respect to a picture according to the CCIR (International Radio Consultative Committee) is 720 (horizontal 22 pixels)×480 (vertical pixels), with each of the first through fourth intra-segments comprising 48×32 pixels, respectively. Each intra-segment includes six macroblocks with each macroblock composed of 16×16 pixels as shown in FIGS. 4A through 6B. This intra-segment size can refresh an overall screen in a period of fifteen image frames. Also, in the case of the video signal of which the thirty frames per second are transmitted, each intra-segment becomes placed in the same position twice every second. Although the size of each of the first through fourth intra-segments can be randomly determined by the system to be adapted thereto, it is desirable to choose a size will allow the overall screen to be refreshed at least several times per a second.

The operation of the FIG. 3 apparatus will be described according to one among the above-described low-delay encoding methods.

When the FIG. 3 apparatus performs an inter-frame encoding operation, that is, if video data is applied to a subtractor from an external video data source (not shown) outside of the above-described intra-segments, refresher portion 12 turns on first and second switches 13 and 14. Subtractor 1 subtracts data supplied from a motion compensator 11 from the input data, and outputs the differential data resulting from the subtraction to a transformer 2. Transformer 2 transforms this differential data of a spatial domain into transformation coefficients of a frequency domain. The transformation coefficients are input to a quantizer 3 which quantizes the transformation coefficients according to quantization level signal Q feedback from a buffer 5. The data output from quantizer 3 is processed by a variable-length coder 4 and then stored in buffer 5. Buffer 5 generates quantization level signal Q for transmitting the input data at a constant transmission rate. Quantization level signal Q is applied to quantizer 3, and is used for preventing buffer 5 from overflowing or underflowing. The data output from quantizer 3 and the quantization level signal Q output from buffer 5 are also applied to an inverse quantizer 6. Inverse quandtizer 6 inversely quantizes the input data. The data output from inverse quantizer 6 is transformed into data of a spatial domain by an inverse transformer 7. An adder 8 adds the differential data supplied from motion compensator 11 to the data supplied from inverse transformer 7, and outputs the added result to a frame memory 9. Frame memory 9 stores the data output from adder 8 in units of a frame and reconstructs the image. A motion estimator 10 uses the video data supplied from the external video data source and the data stored in frame memory 9 and performs a well-known motion estimation operation, with a result that a motion vector is outputs to motion compensator 11. Motion compensator 11 outputs the data in frame memory 9 and designated by the motion vector to subtractor 1.

On the other hand, the FIG. 3 apparatus also performs an intra-frame encoding operation, if the video data applied to subtractor 1 from the external video data source exists will in the above-described intra-segments, refresher 12 turns off first and second switches 13 and 14. In this case, adder 8 outputs the intra-frame-encoded data output from inverse transformer 7 to frame memory 9.

On the other hand, when the FIG. 3 apparatus performs a low-delay encoding operation relating to FIGS. 6A and 6B, a first intra-segment can be overlapped with a third intra-segment as can be seen from FIGS. 6B ("A" of FIG. 6B). Even in such a case, since one overlapped intra-segment is obtained by overlapping a first intra-segment with a third intra-segment, refresher 12 turns off switch 13 and 14 with respect to the video data contained in the overlapped intra-segment in order to perform intra-frame encoding therein.

As described above, the low-delay encoding methods for encoding moving pictures according present invention can remarkably improve problems that the artifacts show up on the screen by a conventional low-delay encoding method using an intra-slice concept or an intra-column concept, when there is a large amount of motion between moving pictures in a horizontal direction or a vertical direction.

While only certain embodiments of the invention have been specifically described herein, it will apparent that numerous modifications may be made thereto without departing from the spirit and scope of the invention.

What is claimed:

1. A method of low-delay-encoding digital video data for moving pictures, said method comprising the steps of:
   (a) determining a first row position containing first intra-segments in an image frame and a second row position containing second intra-segments therein, wherein segments in each row are enumerated sequentially across the row and said first intra-segments are odd-numbered and said second intra-segments are even-numbered, each intra-segment having a respectively predetermined size, wherein said first intra-segments are offset by one intra-segment width with respect to said second intra-segments;
   (b) intra-frame-encoding video data contained in the first and second intra-segments among the video data in the image frame, and inter-frame-encoding video data which exists outside of the first and second intra-segments; and (c) re-determining said first and second row positions containing, respectively, the first and second intra-segments with respect to the image frame to be used for encoding, by shifting the first row position containing the first intra-segments from the upper end of the screen to the lower end thereof by a predetermined interval, and by shifting the second row position containing the second intra-segments from the lower end of the screen to the upper end thereof by the predetermined interval, whenever the image is changed.

2. The low-delay encoding method according to claim 1, wherein said step (a) further comprises determining the second row position containing the second intra-segments as the lowermost end of the screen and determining the first row position containing the first intra-segments as the uppermost end of the screen.

3. The low-delay encoding method according to claim 1, wherein each of said intra-segments has a size in which the position thereof is determined with respect to the overall screen if at least fifteen image frames are passed.

4. The low-delay encoding method according to claim 1, wherein said step (c) further comprises the step of redetermining the first and second row positions by shifting the first and second intra-segments by a respective vertical length whenever the image frame is changed.

5. A method of low-delay-encoding digital video data for moving pictures, said method comprising the steps of:

(a) determining a first column position containing first intra-segments in an image frame and a second column position containing second intra-segments therein, wherein segments in each column are enumerated sequentially down the column and said first intra-segments are odd-numbered and said second intra-segments are even numbered, each intra-segment having a respectively predetermined size, wherein said first intra-segments are offset by one intra-segment width with respect to said second intra-segments;

(b) intra-frame-encoding video data contained in the first and second intra-segments among the video data in the image frame, and inter-frame-encoding video data which exists outside of the first and second intra-segments; and (c) re-determining said first and second column positions containing, respectively, the first and second intra-segments which respect to the image frame to be used for encoding, by shifting the first column position containing the first intra-segments from the left end of the screen to the right end thereof by a predetermined interval, and by shifting the second column position containing the second intra-segments from the right end of the screen to the left end thereof by the predetermined interval, whenever the image is changed.

6. The low-delay encoding method according to claim 5, wherein said step (a) further comprises determining the second column position containing the second intra-segments as the rightmost end of the screen and determining the first column position containing the first intra-segments as the leftmost end of the screen.

7. The low-delay encoding method according to claim 5, wherein each of said intra-segments has a size in which the position thereof is determined with respect to the overall screen if at least fifteen image frames are passed.

8. The low-delay encoding method according to claim 5, wherein said step (c) further comprises the step of redetermining the first and second column positions by shifting the first and second intra-segments by a respective horizontal length whenever the image frame is changed.

9. A method of low-delay-encoding digital video data for moving pictures, said method comprising the steps of:

(a) determining a first row position containing first intra-segments in an image frame and a second row position containing second intra-segments therein, wherein segments in each row are enumerated sequentially across the row and said first intra-segments are odd-numbered and said second intra-segments are even-numbered, each intra-segment having a respectively predetermined size, wherein said first intra-segments are offset by one intra-segment width with respect to said second intra-segments;

(b) determining a first column position containing third intra-segments in the image frame and a second column position containing fourth intra-segments therein, wherein segments in each column are enumerated sequentially down the column and said third intra-segments are odd-numbered and said fourth intra-segments are even-numbered, each intra-segment having a respectively predetermined size, wherein said third intra-segments are offset by one intra-segment width with respect to said fourth intra-segments;

(c) intra-frame-encoding video data contained in the first, second, third, and fourth intra-segments among the video data in the image frame, and intra-frame-encoding video data which exists outside of the first, second, third, and fourth intra-segments; and (d) re-determining first and second row positions and first and second column positions containing, respectively, the first, second, third, and fourth intra-segments with respect to the image frame to be used for encoding, by shifting the first row position containing the first intra-segments from the upper end of the screen to the lower end thereof by a predetermined interval, shifting the second row position containing the second intra-segments from the lower end of the screen to the upper end thereof by the predetermined interval, shifting the first column position containing the third intra-segments from the left end of the screen to the right end thereof by the predetermined interval, and shifting the second column position containing the fourth intra-segments from the right end of the screen to the left end thereof by the predetermined interval, whenever the image frame is change.

10. The low-delay encoding method according to claim 9, wherein said step (a) further comprises determining the second row position containing the second intra-segments as the lowermost end of the screen and determining the first row position containing the first intra-segments as the uppermost end of the screen.

11. The low-delay encoding method according to claim 9, wherein said step (b) further comprises determining the second column position containing the second intra-segments as the rightmost end of the screen and determining the first column position containing the first intra-segments as the leftmost end of the screen.

12. The low-delay encoding method according to claim 9, wherein each of said intra-segments has a size for which the position thereof on said screen is determined at least twice per second.

13. The low-delay encoding method according to claim 9, wherein each of said intra-segments has a size in which the position thereof is determined with respect to the overall screen if at least fifteen image frames are passed.

14. The low delay encoding method according to claim 9, wherein said step (c) further comprises the step of redetermining the first and second row positions by shifting the first and second intra-segments by a respective vertical length whenever the image frame is changed, and redetermining the first and second column positions by shifting the third and fourth intra-segments by a respective horizontal length whenever the image frame is changed.

* * * * *